(12) United States Patent
Plesnik

(10) Patent No.: US 9,722,498 B2
(45) Date of Patent: Aug. 1, 2017

(54) CONTROL CIRCUIT FOR SWITCHING POWER CONVERTERS WITH SYNCHRONOUS RECTIFIERS

(71) Applicant: Martin Plesnik, Ottawa (CA)

(72) Inventor: Martin Plesnik, Ottawa (CA)

(73) Assignee: Alcatel Lucent, Boulogne-Billancourt (FR)

(*) Notice: Subject to any disclaimer, the term of this patent is extended or adjusted under 35 U.S.C. 154(b) by 797 days.

(21) Appl. No.: 13/738,361

(22) Filed: Jan. 10, 2013

(65) Prior Publication Data

US 2014/0192561 A1    Jul. 10, 2014

(51) Int. Cl.
*H02M 3/335* (2006.01)

(52) U.S. Cl.
CPC ... *H02M 3/33546* (2013.01); *H02M 3/33592* (2013.01); *Y02B 70/1475* (2013.01)

(58) Field of Classification Search
CPC .......... H02M 3/33546; H02M 3/1588; H02M 3/325; H02M 3/335; H02M 3/3307; H02M 3/33515; H02M 3/33523; H02M 3/3353; H02M 3/33538; H02M 3/33553; H02M 3/33592
USPC ............... 363/21.03, 21.06, 21.14, 20–21.18
See application file for complete search history.

(56) References Cited

U.S. PATENT DOCUMENTS

| | | | |
|---|---|---|---|
| 4,768,142 A | 8/1988 | Pasma | |
| 5,933,337 A | 8/1999 | Teramae et al. | |
| 6,894,468 B1 * | 5/2005 | Bretz et al. | 323/274 |
| 7,054,168 B1 * | 5/2006 | Fronk | 363/21.06 |
| 7,589,982 B2 * | 9/2009 | Wang et al. | 363/21.06 |
| 8,350,519 B2 | 1/2013 | Brantner et al. | |
| 2009/0109715 A1 * | 4/2009 | Yang et al. | 363/89 |
| 2013/0121044 A1 * | 5/2013 | Gao et al. | 363/50 |

FOREIGN PATENT DOCUMENTS

EP    1499004    9/2012

OTHER PUBLICATIONS

Notification of Transmittal of The International Search Report and the Written Opinion of the International Searching Authority, or the Declaration, issued in PCT/CA1014/050008, Apr. 10, 2014.

* cited by examiner

*Primary Examiner* — Emily P Pham
*Assistant Examiner* — Shahzeb K Ahmad
(74) *Attorney, Agent, or Firm* — Kramer & Amado, P.C.

(57) ABSTRACT

A control circuit for switching power converters with synchronous rectifiers is disclosed for providing start-up and shut-down protection. The control circuit for switching power converters with synchronous rectifiers includes a device for blocking the driving signals to the synchronous rectifiers, a voltage sampling circuit, a reference voltage, and a comparator. The comparator compares a sample voltage to a reference voltage to determine when to block and when to admit driving signals to the synchronous rectifiers. The control circuit for switching power converters with synchronous rectifiers is particularly useful for minimizing component damage due to start-up and shut-down transients.

10 Claims, 4 Drawing Sheets

CONTROL CIRCUIT FOR SWITCHING POWER CONVERTERS WITH SYNCHRONOUS RECTIFIERS

FIELD OF THE INVENTION

The present invention relates to control circuits for synchronous rectifiers and is particularly concerned with providing start-up and shut-down protection for such rectifiers.

BACKGROUND OF THE INVENTION

The use actively-controlled switches such as transistors, usually power MOSFETs or power BJTs, to replace diodes is a technique for improving the efficiency of rectification in power supplies.

In low voltage converters, for example around 10 volts and less, the voltage drop of a silicon rectifying diode (typically around 0.7 to 1 volt for a silicon diode at its rated current) has an adverse effect on efficiency. One solution known in the art is to replace standard silicon diodes with Schottky diodes, which exhibit very low voltage drops (as low as 0.5 volts). However, even Schottky rectifiers can be exhibit significant losses, notably at high currents and low voltages.

In power supplies using synchronous rectification, power switches replace the rectification diodes and are driven synchronously with the waveform to be rectified so that the switch is conducting during a portion of the waveform and blocking during the remaining portion of the waveform.

Several methods for driving synchronous rectifiers are known in the art. The basic categorization involves directly driven methods and self-driven methods.

With the directly driven methods, the driving signal is generated by an integrated controller device typically circuitry contained in an integrated circuit chip. The cost of the integrated controllers may be significant.

With the self-driven methods, the driving signal is generated using discrete components and extra transformer windings which produce the necessary signals for driving the synchronous rectifying devices.

By way of example of an existing solution, referring to FIG. 1 there may be seen an electrical schematic diagram of a power supply having self-driven synchronous rectifying elements. Primary input voltage is provided at 101 to one side of the primary winding 103 of power transformer 102. Coupled to the other side of primary winding 103 is capacitor 107 and first primary drive field effect transistor (FET) 109. Second primary drive FET transistor 108 is connected to the other side of capacitor 107 and then to the other primary input voltage leads 111. First primary FET transistor also connects to the other primary input voltage lead 111. Gate drive for FET transistors 108 and 109 is provided at 110 and 112 respectively and consists of appropriate out-of-phase drive signals which alternately turn on and off FETs 108 and 109 to produce an alternating current in primary winding 103 of transformer 102.

Secondary winding 104 of transformer 102 has two synchronous rectifying FET transistors, FET 114 and FET 115 which are driven by circuitry described below so as to conduct at appropriate times to rectify the voltage waveform produced across secondary winding 104. Filter inductor 113 and filter capacitor 116 act to smooth voltage and current variations in the output current and voltage respectively. Resistor 118 and capacitor 117 are illustrative of loads on the power supply, while a secondary side ground reference point may be seen at 119a.

Tertiary windings 105 and 106 of transformer 102 serve to produce the driving voltages for the synchronous rectifying FETs 114 and 115. Voltage pulses produced at windings 105 and 106 due to the variations in current in the primary winding 103 are passed through capacitors 120 and 123 respectively, to the gates of FETs 114 and 115 respectively. Diodes 121 and 124 serve to provide a current path during the reverse voltage cycles of windings 105 and 106, while resistors 122 and 125 ensure that the gates of FETs 114 and 115 will be turned off when no driving voltage is present. A secondary side ground reference point may be seen at 119b, and in this example is conductively continuous with 119a.

This solution may contain several disadvantageous operational characteristics. Firstly, during the converter start-up operation, the synchronous rectifier driving circuit can pull current out from the circuit load. Since the magnitude of this current for the driving is essentially uncontrollable, the current flowing from the circuit load represents significant risk of component failures on both sides, i.e. on the side of power converter and on the side of circuit load. In the industry, this problem is frequently referred to as the pre-biased output start-up problem. Secondly, during the converter shut-down operation, the driving circuit may generate driving voltages which can exceed the synchronous rectifier ratings introducing risk of the rectifiers and overall power converter failure.

In view of the foregoing, it would be desirable to provide a means for enabling such a synchronous rectifier power supply to operate reliably and fault-free during start-up and shut-down transients.

SUMMARY OF THE INVENTION

It is an object of the invention to provide a method and apparatus for enabling a synchronous rectifier power supply to operate reliably and fault-free during start-up and shut-down transients.

According to a first aspect of the invention there is disclosed a power converter fed by a primary voltage, the power converter having synchronous rectifying elements and producing a secondary voltage, the power converter having driving circuitry for the synchronous rectifying elements; blocking circuitry connected between the driving circuitry and the synchronous rectifying elements; secondary voltage sampling circuitry; and control circuitry which activates the blocking circuitry in the event that the secondary voltage sampling circuitry indicates a secondary voltage below a preconfigured value.

In some embodiments of this aspect the control circuitry has a comparator; the voltage sampling circuit is connected to a first input of the comparator; a reference voltage circuit is connected to a second input of the comparator; and the output of the comparator is connected to the blocking circuitry for controlling the blocking operation.

In some of these embodiments the power converter has a power transformer having primary, secondary and tertiary windings; the secondary windings producing the secondary voltage; and the tertiary windings connected to the driving circuitry. In some of these embodiments there is a local power supply circuit connected to the tertiary windings. In some of these embodiments the local power supply circuit has a rectifying diode having an anode connected to the tertiary windings; a filter capacitor connected to the rectifying diode; and a load resistor.

In some embodiments the reference voltage circuit has a Zener diode and a resistor in series; the resistor connected to the local power supply circuit at a proximate end; the resistor connected at a distal end to the Zener diode's cathode; the Zener diode connected to a local circuit ground at the anode end; and the junction of the Zener diode and the resistor connected to the comparator input.

According to another aspect of the invention there is disclosed a method of controlling a power converter fed by a primary voltage and producing a secondary voltage; the power converter having synchronous rectifying elements controlled by a control voltage; the method having the steps of sensing the secondary voltage, and in the event that the secondary voltage is below a predetermined value, blocking the control volt from reaching the synchronous rectifying element.

In some of these embodiments the synchronous rectifying elements are Field Effect Transistors. In some embodiments of this aspect of the invention the sensing step is performed by a comparator comparing the secondary voltage to a reference voltage. In some embodiments of this aspect of the invention, the blocking step is performed by bipolar transistors controlled by the output of the comparator.

Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which like reference numbers are used to represent like elements, and.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

In the following figures, like reference numbers are used to represent like elements.

Figure 1:
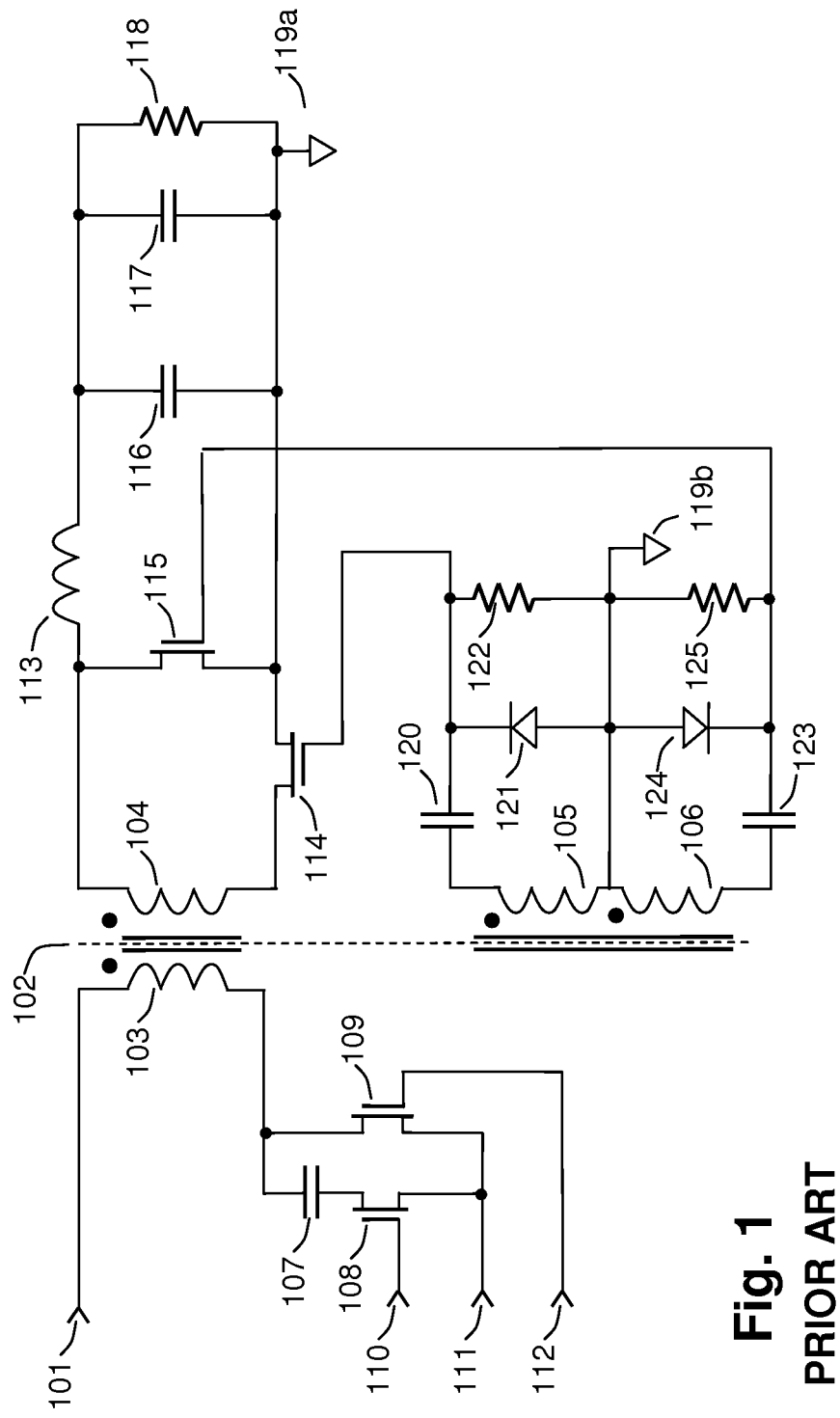
FIG. 1 illustrates an exemplary self-driving synchronous power supply circuit diagram according to the prior art.
Figure 2:
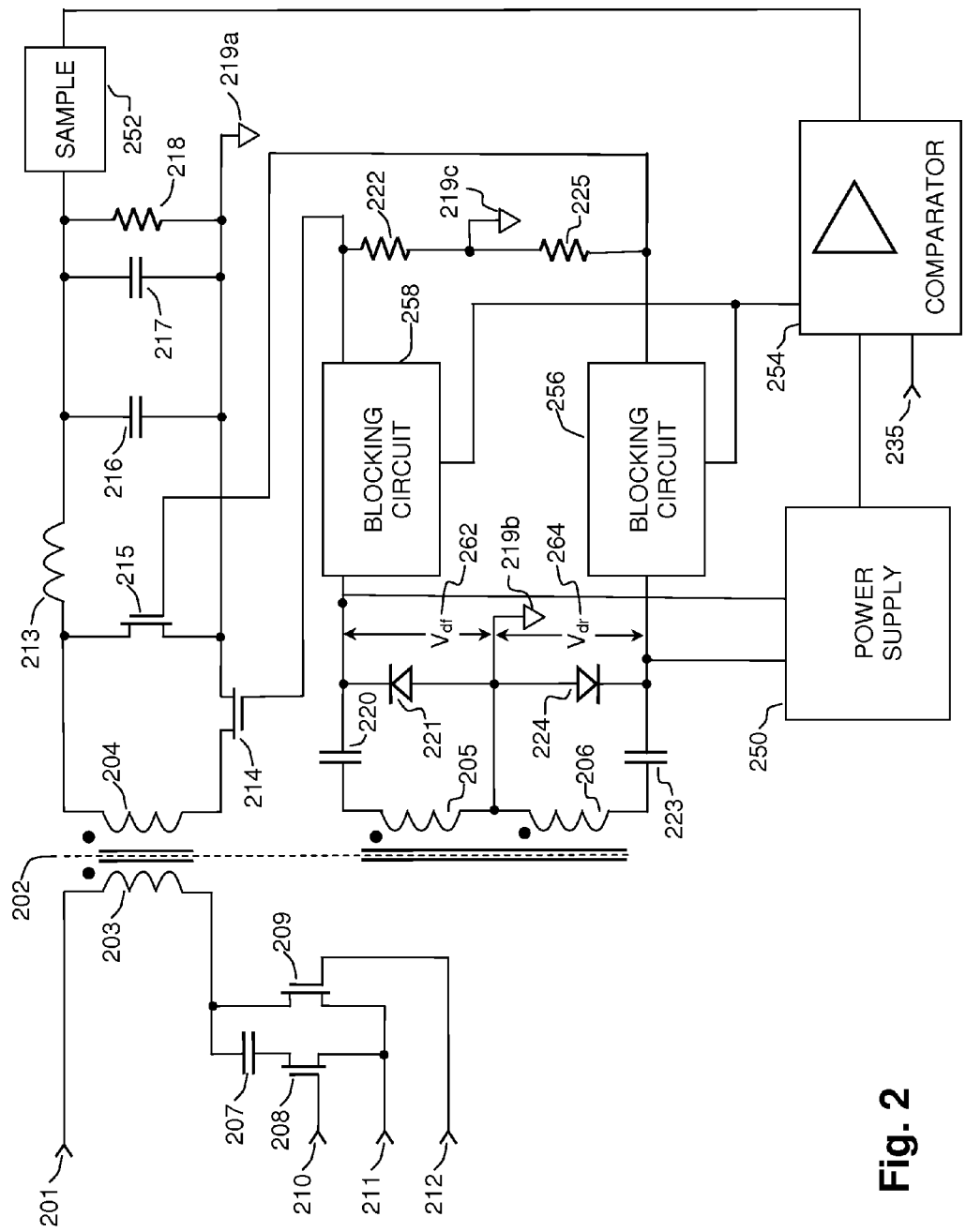
FIG. 2 illustrates an exemplary self-driving synchronous power supply circuit diagram with new elements according to an embodiment of the invention.

Referring to FIG. 2 there may be seen a circuit diagram of a self-driven synchronous power supply with new elements according to an embodiment of the invention. Primary input voltage is provided at 201 to one side of the primary winding 203 of power transformer 202. Coupled to the other side of primary winding 203 is capacitor 207 and first primary drive field effect transistor (FET) 209. Second primary drive FET 208 is connected to the other side of capacitor 207 and then to the other primary input voltage lead 211. First primary drive FET also connects to the other primary input voltage lead 211. Gate drive for FETs 208 and 209 is provided at 210 and 212 respectively and consists of appropriate out-of-phase drive signals which alternately turn on and off FETs 208 and 209 to produce an alternating current in primary winding 203 of transformer 202.

Secondary winding 204 of transformer 202 has two synchronous rectifying FETs, FET 214 and FET 215 which are driven by circuitry described below so as to conduct at appropriate times to rectify the voltage waveform produced across secondary winding 204. Filter inductor 213 and filter capacitor 216 act to smooth voltage and current variations in the output current and voltage respectively. Resistor 218 and capacitor 217 are illustrative of loads on the power supply, while a secondary side ground reference point may be seen at 219a.

Tertiary windings 205 and 206 of transformer 202 serve to produce the driving voltages for the synchronous rectifying FETs 214 and 215. Voltage pulses produced at windings 205 and 206 due to the variations in current in the primary winding 203 are passed through capacitors 220 and 223 respectively, to the gates of FETs 214 and 215 respectively through the blocking circuits 258 and 256. Diodes 221 and 224 serve to provide a current path during the reverse voltage cycles of windings 205 and 206, while resistors 222 and 225 ensure that the gates of FET transistors 214 and 215 will be turned off when no driving voltage is present. A secondary side ground reference point may be seen at 219b, and in this example is conductively continuous with 219a.

Power supply block 250 derives a supply voltage from the tertiary windings 205 and 206 of power transformer 202 through capacitors 220 and 223. The power supply voltage of power supply block 250 is used to power comparator circuitry 254 which is provided with a sample 252 of the secondary voltage and a reference voltage 235. In operation, insofar as the sampled voltage of the secondary voltage is some amount below the reference voltage 235, the comparator will operate to activate the two blocking circuits 256 and 258. These blocking circuits act to block the synchronous drive signals from capacitors 220 and 223 during portions of the start-up and shut-down operation of the power supply. More specifically, these blocking circuits can act to block the synchronous drive signals when the secondary output voltage is below a pre-established amount.

Figure 3:
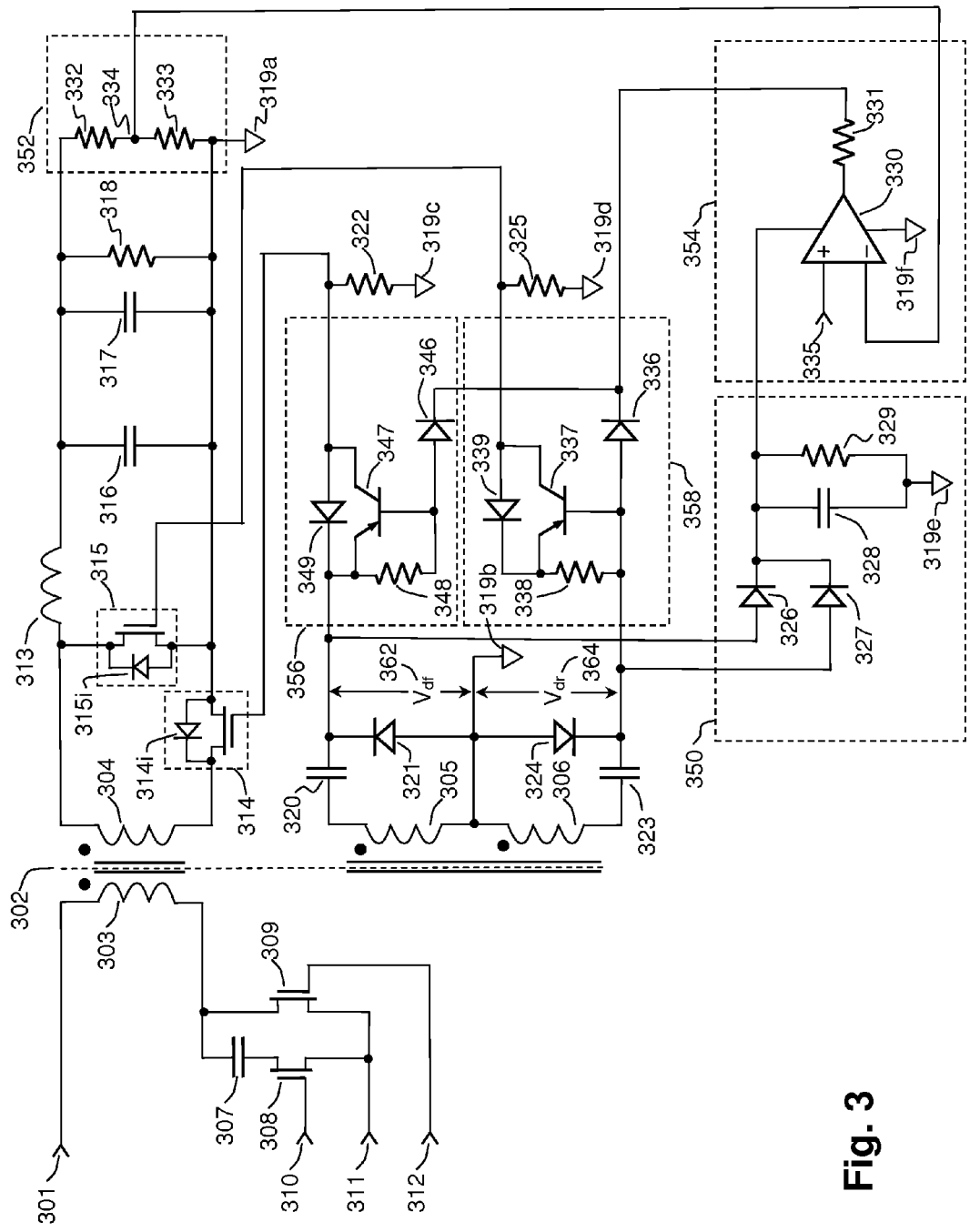
FIG. 3 illustrates an exemplary self-driving synchronous power supply circuit diagram with specific circuit elements according to an embodiment of the invention.

The various blocks of power supply 250, comparator 254, blocking circuits 256 and 258, and voltage sample block 252 may be realized in alternative ways evident to one skilled in the art. FIG. 3 provides a circuit schematic of one exemplary way to realize these circuit blocks.

Referring to FIG. 3 there may be seen a circuit diagram of a self-driven synchronous power supply with elements having reference numbers similar to corresponding elements in FIG. 2. Primary input voltage is provided at 301 to one side of the primary winding 303 of power transformer 302. Coupled to the other side of primary winding 303 is capacitor 307 and first primary drive field effect transistor (FET) 309. Second primary drive FET 308 is connected to the other side of capacitor 307 and then to the other primary input voltage lead 311. First primary drive FET also connects to the other primary input voltage lead 311. Gate drive for FETs 308 and 309 is provided at 310 and 312 respectively and consists of appropriate out-of-phase drive signals which alternately turn on and off FETs 308 and 309 to produce an alternating current in primary winding 303 of transformer 302.

Secondary winding 304 of transformer 302 has two synchronous rectifying FETs, FET 314 and FET 315 which are driven by circuitry described below so as to conduct at appropriate times to rectify the voltage waveform produced across secondary winding 304. Filter inductor 313 and filter capacitor 316 act to smooth voltage and current variations in the output current and voltage respectively. Resistor 318 and capacitor 317 are illustrative of loads on the power supply, while a secondary side ground reference point may be seen at 319a.

Tertiary windings 305 and 306 of transformer 302 serve to produce the driving voltages for the synchronous rectifying FETs 314 and 315. Voltage pulses produced at windings 305 and 306 due to the variations in current in the primary winding 303 are passed through capacitors 320 and 323 respectively, to blocking circuits 356 and 358 respectively and then to the gates of FET transistors 314 and 315 respectively. Diodes 321 and 324 serve to provide a current path during the reverse voltage cycles of windings 305 and 306, while resistors 322 and 325 ensure that the gates of FET transistors 314 and 315 will be turned off when no driving voltage is present. Resistors 322 and 325 are terminated at secondary ground reference points 319c and 319d respectively, which are continuous with 319a. A secondary side ground reference point may also be seen at 319b, and is likewise conductively continuous with 319a.

Power supply block 350 derives a supply voltage from the tertiary windings 305 and 306 of power transformer 302 through capacitors 320 and 323. Diodes 326 and 327 rectify the supplied voltage pulses while filter capacitor 328 and load resistor 329 smooth the provided voltage so that it may serve as a supply rail to comparator 330. Resistor 329 has a value that provides the desired hold-up time for the power supply block. Power supply block 350 is referenced to secondary side ground 319e which is conductively continuous with the other secondary side ground references.

Comparator 330 is powered, as described, by power supply block 350 and is further referenced to secondary side ground 319f which is conductively continuous with the other secondary side ground references for its other power rail. Comparator 330 is provided by a reference voltage 335 at its non-inverting input. This reference voltage may be derived by any convenient means known in the art, for example via a resistor-Zener diode pair or a bandgap voltage reference source. The inverting input of comparator 330 is supplied with a voltage sample 334 generated by the resistor stack of resistors 332 and 333. The voltage sample 334 will be a fraction of the secondary voltage, the fraction defined by the ratio of resistors 332 and 333. The output of comparator 330 is fed through resistor 331 to blocking circuits 356 and 358.

Blocking circuit 356 has diode 346, PNP transistor 347, resistor 348, and diode 349 connected as shown. Likewise, blocking circuit 358 has diode 336, PNP transistor 337, resistor 338, and diode 339 connected as shown. In order for synchronous pulses from capacitors 320 and 323 to reach the gates of FETs 314 and 315 respectively, the output of comparator 330 must be pulling the cathodes of diodes 346 and 336 low so that transistors 347 and 337 will be rendered non-blocking.

Other gate current control circuits than are depicted in FIGS. 2 and 3 may be used between synchronous rectifier transistor gate (e.g. gate of FET transistor 315) and driver output (e.g. collector of transistor 347). For example, two parallel resistors of different values, one connected directly between the synchronous rectifier transistor gate and driver output and the second one in series with a diode with the diode's anode is connected to the synchronous rectifier FET transistor gate. Alternatively, capacitors connected between the synchronous rectifier transistor gate and ground, are another example of gate control circuits.

Figure 4:
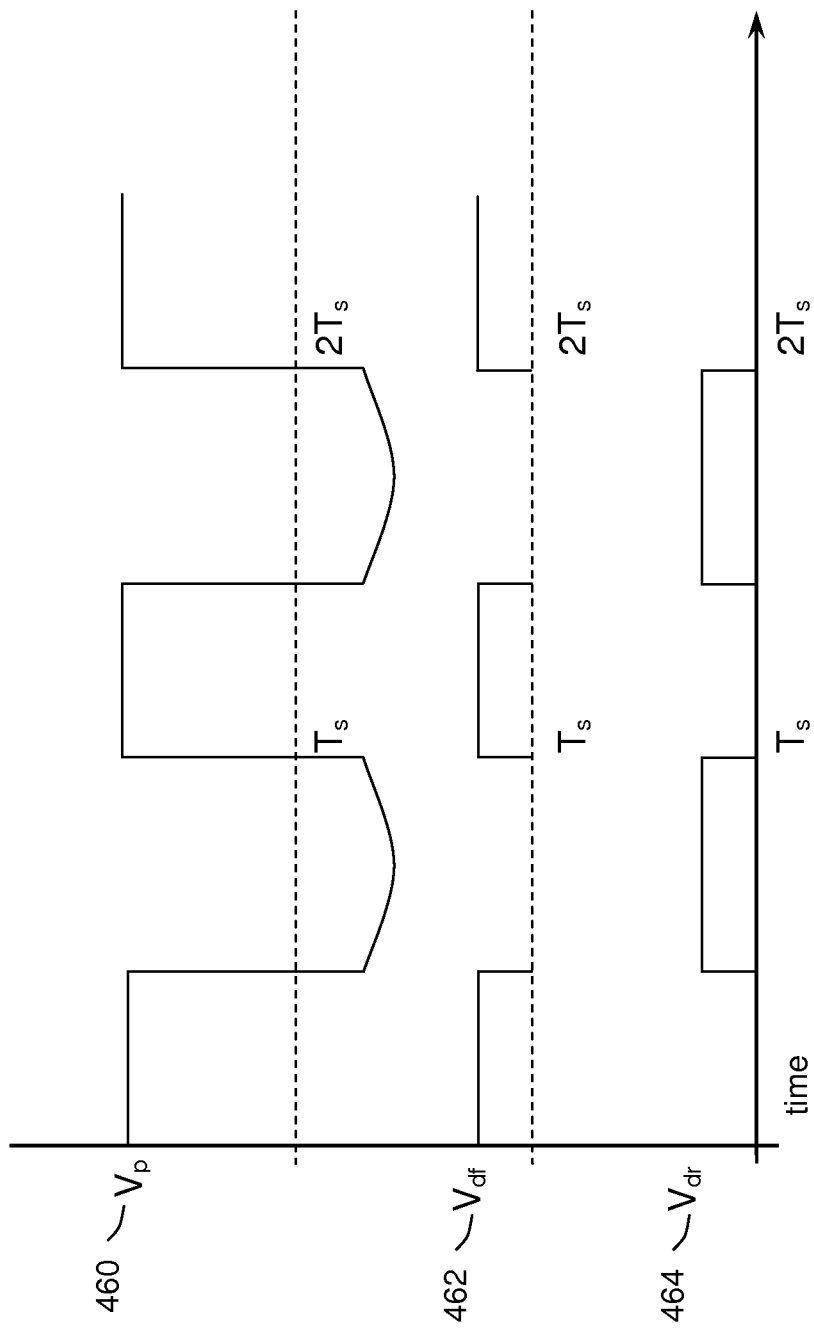
FIG. 4 illustrates series of voltage waveforms which may be found in association with the operation of the self-driving synchronous power supply of FIG. 3.

The operation of the circuit will now be described in conjunction with the exemplary component arrangement of FIG. 3 and the voltage waveforms depicted in FIG. 4.

In operation, the synchronous activity occurs repetitively with respect to a switching cycle with period T. The voltage waveform of the primary winding 303, designated as $V_p$ 460 in FIG. 4, produces voltages in 302 transformer tertiary windings 305 and 306, which couple with voltages across capacitors 320 and 323 respectively, generate driving voltages designated as $V_{df}$ 262 and $V_{dr}$ 264 in FIG. 2; $V_{df}$ 362 and $V_{dr}$ 364 in FIG. 3; and $V_{df}$ 462 and $V_{dr}$ 464 in FIG. 4, respectively.

Diodes 326, 327 and capacitor 328 generate proper supply voltage for comparator 330 relatively quickly upon initial start-up from the driving signals $V_{df}$ 462 and $V_{dr}$ 464. As a result of the rapid power-up the comparator is ready to control the synchronous rectifier driving circuit via the blocking circuits almost immediately upon driving signals occurring upon the tertiary windings.

During the start-up or shut-down time intervals, when the secondary output voltage is such that the voltage reference derived from the resistor divider 332 and 333 is below the reference voltage 335, the comparator 330 sets its output high and through resistor 331 turns the transistors 337 and 347 off. Consequently, the gates of the synchronous rectifiers 314 and 315 are pulled low via resistors 322 and 325. The synchronous rectifiers are disabled. While the synchronous rectifiers 314 and 315 are disabled, the intrinsic diodes 314i and 315i allows the converter to operate. However, the current cannot flow from the load capacitor 317 back to the converter.

When, during the start-up or shut-down time, the secondary output voltage rises such that the voltage reference derived from the resistor divider 332 and 333 is above the reference voltage 335, the comparator 330 sets its output low and through resistor 331 turns the transistors 337 and 347 on. The synchronous rectifiers are enabled to operate.

During the shut-down operation in a self-driven synchronous power supply, the power supply circuits will see collapsing voltages and currents. At certain point, the power supply control circuitry will stop operating however, the energy stored in inductances and capacitors may still be significant. Consequently, the power supply may enter into an undesirable oscillation state resulting in excessive tertiary winding voltages $V_{df}$ 462 and $V_{dr}$ 464. In some cases, these voltages may reach a magnitude of several tens of volts significantly exceeding the gate-to-source voltage rating of the synchronous rectifier transistors 314 and 315. As a result, the synchronous rectifier transistors 314 and 315 may fail.

As embodiments of this invention essentially disconnects the driving voltages $V_{df}$ 462 and $V_{dr}$ 464 from the synchronous rectifiers transistors 314 and 315, protection is provided during this vulnerable time period. In order for reliable operation, it is preferable that the blocking circuit components satisfy the following component ratings, where:

$V_{ce,e}$ is the collector-to-emitter rating of the transistors 337 and 347;

$V_{r,s}$ is the reverse voltage rating of the diodes 339 and 349; and $V_{gs,sr}$ is the gate-to-source voltage rating of the synchronous rectifiers 315 and 315.

And the conditions to be satisfied are:

$$V_{ce,e} \gg V_{gs,sr}$$

$$V_{r,s} \gg V_{gs,sr}$$

Therefore what has been disclosed is a means for enabling a synchronous rectifier power supply to operate reliably and fault-free during start-up and shut-down transients.

Numerous modifications, variations and adaptations may be made to the embodiment of the invention described above without departing from the scope of the invention, which is defined in the claims.

What is claimed is:

1. A power converter fed by a primary voltage, said power converter having synchronous rectifying elements and producing a secondary voltage, the power converter comprising:
    driving circuitry for said synchronous rectifying elements;
    blocking circuitry connected between said driving circuitry and said synchronous rectifying elements;
    secondary voltage sampling circuitry; and
    control circuitry which is configured to activate said blocking circuitry when said secondary voltage sampling circuitry indicates the secondary voltage is below a preconfigured value.

2. The power converter as claimed in claim 1, said control circuitry comprising:
    a comparator having a first input, a second input, and an output, wherein the output of the comparator is connected to the blocking circuitry to control a blocking operation and said secondary voltage sampling circuitry is connected to a first input of said comparator; and
    a reference voltage circuit connected to the second input of said comparator.

3. The power converter as claimed in claim 1, further comprising:
    a power transformer having a primary winding, a secondary winding configured to produce the second voltage, and a tertiary winding connected to said driving circuitry.

4. The power converter as claimed in claim 3, further comprising:
    a local power supply circuit connected to said tertiary winding.

5. The power converter as claimed in claim 4, said reference voltage circuit comprising:
    a Zener diode; and
    a resistor in series, wherein said resistor is connected to said local power supply circuit at a proximal end and connected at a distal end to said Zener diode, and said Zener diode is connected to a local circuit ground at an end not connected to the resistor, and a junction of said Zener diode and said resistor is connected to said comparator input.

6. The power converter as claimed in claim 4, said local power supply circuit comprising:
    a rectifying diode having an anode connected to said tertiary winding;
    a filter capacitor connected to said rectifying diode; and
    a load resistor.

7. A method of controlling a power converter fed by a primary voltage and producing a secondary voltage, wherein said power converter comprises synchronous rectifying elements with driving circuitry controlled by a control voltage; the method comprising:
    sensing said secondary voltage; and
    in the event that said secondary voltage is below a predetermined value, blocking, with blocking circuitry connected between the driving circuitry and the synchronous rectifying elements, said control voltage from reaching said synchronous rectifying elements.

8. The method as claimed in claim 7, wherein said synchronous rectifying elements comprise Field Effect Transistors.

9. The method as claimed in claim 7, wherein said sensing step is performed by a comparator comparing said secondary voltage to a reference voltage.

10. The method as claimed in claim 9, wherein said blocking step is performed by bipolar transistors controlled by an output of said comparator.

* * * * *